(12) United States Patent
Deweese et al.

(10) Patent No.: US 8,922,335 B2
(45) Date of Patent: Dec. 30, 2014

(54) SAFE WEAPON CONTAINER FOR SECURELY RELEASING A DEFENSE WEAPON

(71) Applicants: Timothy Deweese, Los Alamitos, CA (US); Brandon Delibro, Los Alamitos, CA (US)

(72) Inventors: Timothy Deweese, Los Alamitos, CA (US); Brandon Delibro, Los Alamitos, CA (US)

(*) Notice: Subject to any disclaimer, the term of this patent is extended or adjusted under 35 U.S.C. 154(b) by 0 days.

(21) Appl. No.: 14/296,048

(22) Filed: Jun. 4, 2014

(65) Prior Publication Data

US 2014/0285668 A1   Sep. 25, 2014

Related U.S. Application Data

(63) Continuation-in-part of application No. 14/156,410, filed on Jan. 15, 2014.

(60) Provisional application No. 61/753,067, filed on Jan. 16, 2013.

(51) Int. Cl.
| | |
|---|---|
| *G08B 19/00* | (2006.01) |
| *H04N 7/18* | (2006.01) |
| *E05G 1/00* | (2006.01) |
| *E05G 1/02* | (2006.01) |
| *E05G 1/04* | (2006.01) |

(52) U.S. Cl.
CPC .................. *H04N 7/188* (2013.01); *E05G 1/00* (2013.01); *E05G 1/02* (2013.01); *E05G 1/04* (2013.01)
USPC ......... 340/5.25; 340/5.5; 340/5.51; 340/5.52; 340/5.53; 340/5.54; 340/5.61; 340/5.62; 340/5.63; 340/5.64; 340/5.65; 340/5.73; 340/522; 340/528; 340/541; 340/550; 340/600; 700/63; 700/77; 700/78; 42/70.11; 42/71.02; 42/89; 211/4; 211/7; 109/38; 109/73

(58) Field of Classification Search
USPC ............. 340/5.5, 5.51, 5.52, 5.53, 5.54, 5.56, 340/5.61, 5.62, 5.63, 5.64, 5.65, 5.7, 3, 522, 340/528, 541, 550, 600; 70/63, 77, 78; 42/70.11, 71.02, 89; 211/4, 7; 109/38, 109/73
See application file for complete search history.

(56) References Cited

U.S. PATENT DOCUMENTS 2,623,639 A * 12/1952 Levy ................................. 211/4
5,043,720 A * 8/1991 Laurienzo ...................... 340/5.3

(Continued)

FOREIGN PATENT DOCUMENTS

WO    WO 2005013031 A2 *  2/2005

*Primary Examiner* — George Bugg
*Assistant Examiner* — Paul Obiniyi
(74) *Attorney, Agent, or Firm* — Kilpatrick Townsend & Stockton LLP

(57) ABSTRACT

A weapons container for releasing a defense weapon includes a cabinet, a cabinet door, and an interior securing the defense weapon. Upon detection of a fingerprint input by a biometric sensor, a surveillance camera captures video and an audio intercom provides communication with a central command center. A recording system saves the video and audio to a storage database. A delay release lock secures the defense weapon for an amount of time and releases the defense weapon depending on a signal from the central command center. A communications system is connected over a network to the central command center, a local authority, and an emergency responder. The communications system notifies the local authority or the emergency responder upon detection of the fingerprint input and streams the video and audio to the central command center and at least one of the local authority and the emergency responder over the Internet.

20 Claims, 9 Drawing Sheets

(56) References Cited

U.S. PATENT DOCUMENTS

| | | | | |
|---|---|---|---|---|
| 5,619,110 A | * | 4/1997 | Sugimoto et al. | 318/450 |
| 5,701,770 A | * | 12/1997 | Cook et al. | 70/63 |
| 5,746,458 A | * | 5/1998 | Fisher | 292/252 |
| 5,916,087 A | * | 6/1999 | Owens | 5/503.1 |
| 5,952,924 A | * | 9/1999 | Evans et al. | 340/573.1 |
| 6,260,300 B1 | * | 7/2001 | Klebes et al. | 42/70.11 |
| 6,363,760 B1 | * | 4/2002 | Sigmond | 70/63 |
| 6,510,642 B2 | * | 1/2003 | Riener | 42/70.11 |
| 6,523,374 B1 | * | 2/2003 | Owens | 70/63 |
| 6,549,229 B1 | * | 4/2003 | Kirby et al. | 348/14.01 |
| 6,678,984 B1 | * | 1/2004 | Rapp et al. | 42/70.11 |
| 6,786,009 B1 | * | 9/2004 | McGunn et al. | 52/36.2 |
| 6,806,807 B2 | * | 10/2004 | Cayne et al. | 340/5.52 |
| 6,836,556 B1 | * | 12/2004 | Bromba et al. | 382/124 |
| 6,954,859 B1 | * | 10/2005 | Simerly et al. | 726/3 |
| 7,113,071 B2 | * | 9/2006 | Cayne et al. | 340/5.22 |
| 7,881,337 B2 | * | 2/2011 | Lail | 370/466 |
| 8,462,192 B2 | * | 6/2013 | O'Connell | 348/14.01 |
| 8,578,867 B2 | * | 11/2013 | Gustavsson | 109/84 |
| 8,768,294 B2 | * | 7/2014 | Reitnour et al. | 455/404.2 |
| 8,770,117 B2 | * | 7/2014 | Wall et al. | 109/73 |
| 2003/0014755 A1 | * | 1/2003 | Williams | 725/62 |
| 2003/0041787 A1 | * | 3/2003 | Gerstenkorn | 109/73 |
| 2003/0188674 A1 | * | 10/2003 | Bartel et al. | 109/70 |
| 2005/0195823 A1 | * | 9/2005 | Chen et al. | 370/395.1 |
| 2006/0011111 A1 | * | 1/2006 | Stoddard et al. | 109/1 R |
| 2006/0283361 A1 | * | 12/2006 | Bartel et al. | 109/70 |
| 2009/0121861 A1 | * | 5/2009 | Latham et al. | 340/522 |
| 2009/0122143 A1 | * | 5/2009 | Latham et al. | 348/155 |
| 2009/0122144 A1 | * | 5/2009 | Latham et al. | 348/155 |
| 2009/0226050 A1 | * | 9/2009 | Hughes | 382/124 |
| 2011/0001407 A1 | * | 1/2011 | Stradiota | 312/237 |
| 2011/0079170 A1 | * | 4/2011 | Al-Mutairi | 109/23 |
| 2012/0167644 A1 | * | 7/2012 | Berger | 70/144 |
| 2012/0206026 A1 | * | 8/2012 | Emelio | 312/204 |
| 2012/0228243 A1 | * | 9/2012 | Crigger et al. | 211/7 |
| 2013/0025511 A1 | * | 1/2013 | Maxwell | 109/59 R |
| 2013/0133558 A1 | * | 5/2013 | Andrews | 109/50 |
| 2013/0298807 A1 | * | 11/2013 | Wall et al. | 109/38 |
| 2014/0000495 A1 | * | 1/2014 | Spencer | 109/56 |
| 2014/0027394 A1 | * | 1/2014 | Stepp et al. | 211/64 |
| 2014/0145819 A1 | * | 5/2014 | Wall et al. | 340/5.2 |

* cited by examiner

SAFE WEAPON CONTAINER FOR SECURELY RELEASING A DEFENSE WEAPON

CLAIM OF BENEFIT TO PRIOR APPLICATION

This application is a continuation-in-part application of U.S. patent application Ser. No. 14/156,410, entitled "Safe Weapon Container for Securely Releasing a Defense Weapon," filed Jan. 15, 2014, which claims benefit to U.S. Provisional Patent Application 61/753,067, entitled "Safe Weapon Container For Securely Releasing A Defense Weapon," filed Jan. 16, 2013. The entire contents of each of these applications are hereby incorporated by reference, for all purposes, as if fully set forth herein.

BACKGROUND

Embodiments of the invention described in this specification relate generally to weapons containers, and more particularly, to weapons container security.

Many people spend a substantial amount of time in areas that are considered to be free of guns. The notion that some areas of daily life are free of guns is supported by social norms that shape expectations and behavior. For example, people typically do not bring guns to schools, places of religious worship, maternity wards, etc. While it is largely true that most people in gun free environments are not armed, massacres of people in gun free zones are on the rise because the killers know that the victims have limited means of protection. In particular, such massacres are occurring more often than not at schools with children. When a person is prepared to commit malicious and capital offenses, laws preventing the person from carrying a gun into a school zone are largely incapable of working. Because schools are (by law and social norm) gun free zones, preventing such massacres is exceedingly difficult. For instance, a would-be killer who is not deterred by criminal punishment arising out of a murder conviction is capable of randomly killing multiple defenseless children and teachers. As students, teachers, and school administrators do not arm themselves in school zones, schools must rely on the proper enforcement authorities (e.g., police) to protect the children. However, before the police can incapacitate (e.g., kill or apprehend) the killer, there is a window of time for the killer to shoot and kill many children. For instance, even under the best conditions, it could take several minutes for police to arrive at the school and incapacitate the killer.

A weapon cabinet (e.g., a gun cabinet) could be utilized to solve this timing problem. By equipping teachers and/or school administrators with the means of protection, many lives could be saved. Current gun cabinets may include unlock devices to ensure that the guns in the cabinet are only accessible to authorized personnel. However, such gun cabinets typically do not include routine (e.g., 24 hours per day, 7 days per week) monitoring upon activation. Furthermore, these gun cabinets are not suited for massacre situations that may require live video recording, two-way voice communication, and/or dispatching capabilities. For example, even if a killer enters a classroom and is incapacitated by a gunshot wound from the teacher, several other co-conspirator killers may be acting in concert to kill as many people as possible.

BRIEF SUMMARY

In one embodiment, a weapons container for releasing a defense weapon to an authorized user includes a cabinet having a cabinet door and an interior configured to securely receive a defense weapon therein. The weapons container includes one or more processors and a storage database communicatively coupled with and readable by the one or more processors. The storage database has processor-readable instructions stored therein. A biometric sensor detects a fingerprint input from a user. A camera captures a live video upon detection of the fingerprint input. Further, a two-way audio intercom provides live audio communication with a central command center system upon detection of the fingerprint input. The weapons container further includes a recording system that saves at least a portion of the live video and/or the live audio to the storage database. A delay release lock secures the defense weapon for a predetermined amount of time and releases the defense weapon in response to a signal from the central command center system. The weapons container further includes a communications system coupled with the one or more processors and connected over a network to the central command center system, a local authority system, and an emergency responder system. The communications system notifies the local authority system and/or the emergency responder system upon detection of the fingerprint input, and streams the live video and the live audio to at least one of the central command center system, the local authority system, and the emergency responder system over the network.

Other embodiments provide a method for operating a delay release lock secured to a defense weapon stored in a weapons container. One or more processors are provided at the weapons container and coupled to the delay release lock, a sensor, and a communications system connected to a network. The sensor detects a sensory input based on an attempted access to the weapons container and sends an event trigger signal to the processor upon detection of the sensory input. The one or more processors activate, upon receiving the event trigger signal, a camera to capture a live video and/or a two-way audio intercom to send and receive live audio with a central command center system. Further, the one or more processors transmit, through the communications system, the live video and the live audio to at least one of the central command center system, a local authority system, and an emergency responder system. In another step, the one or more processors notify, through the communications system, at least one of the local authority system and the emergency responder system of the attempted access. The one or more processors receive, through the communications system, a command signal from the central command center system, whereby the command signal comprises at least one of a delay signal, a release signal, and a stop signal. The one or more processors may further operate the delay release lock secured to the defense weapon based on the command signal and release the delay release lock after a predetermined amount of time if no command signal is received from the central command center system.

Still, other embodiments of the present disclosure provide a monitoring system for a weapons container that securitizes a defense weapon. The monitoring system comprises one or more processors and a storage database communicatively coupled with and readable by the one or more processors and having stored therein processor-readable instructions. The monitoring system further includes a sensor system that detects an attempted access at the weapons container. A camera captures a live video upon detection of the attempted access. A two-way audio provides live audio communication with a central command center system upon detection of the attempted access. Further, a recording system captures the live video and the live audio for storage in the storage database. A communications system is connected to a network, whereby the communications system notifies, over the network, at least one of a local authority system and an emergency responder system detection of the attempted access, and streams, over the network, the live video and the live audio to the central command center system and to the at least one local authority and emergency responder.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention provide a novel safe weapon container for securely holding a defense weapon that is only accessible to an authorized user upon one or more successful biometric inputs that authenticate the identity of the authorized user. The safe weapon container includes a body, a surveillance camera, an audio intercom, an IP communication interface, a biometric input device, a door status contact device, a tamper switch, and a delay release lock.

The safe weapon container of some embodiments includes a gun safe cabinet that is large enough to house a shot gun. The safe weapon container protects the gun from unauthorized use and tampering. In some embodiments, the gun safe cabinet satisfies UL TL-15 rating standards for gun safes.

When an authorized gun user feels there is a threat that requires lethal force in order to defend their self or others, he or she would present their finger to the biometric finger reader. In some embodiments, when biometric input is received for opening the gun safe, recording of live video and audio is initiated at the site of the safe weapon container. In some embodiments, the live video and audio is transmitted to a central command facility where trained personnel can evaluate the situation (e.g., by viewing and listening and deciding whether or not lethal force is necessary). In some embodiments, the video and audio is streamed over the Internet to the central command facility.

Figure 1:
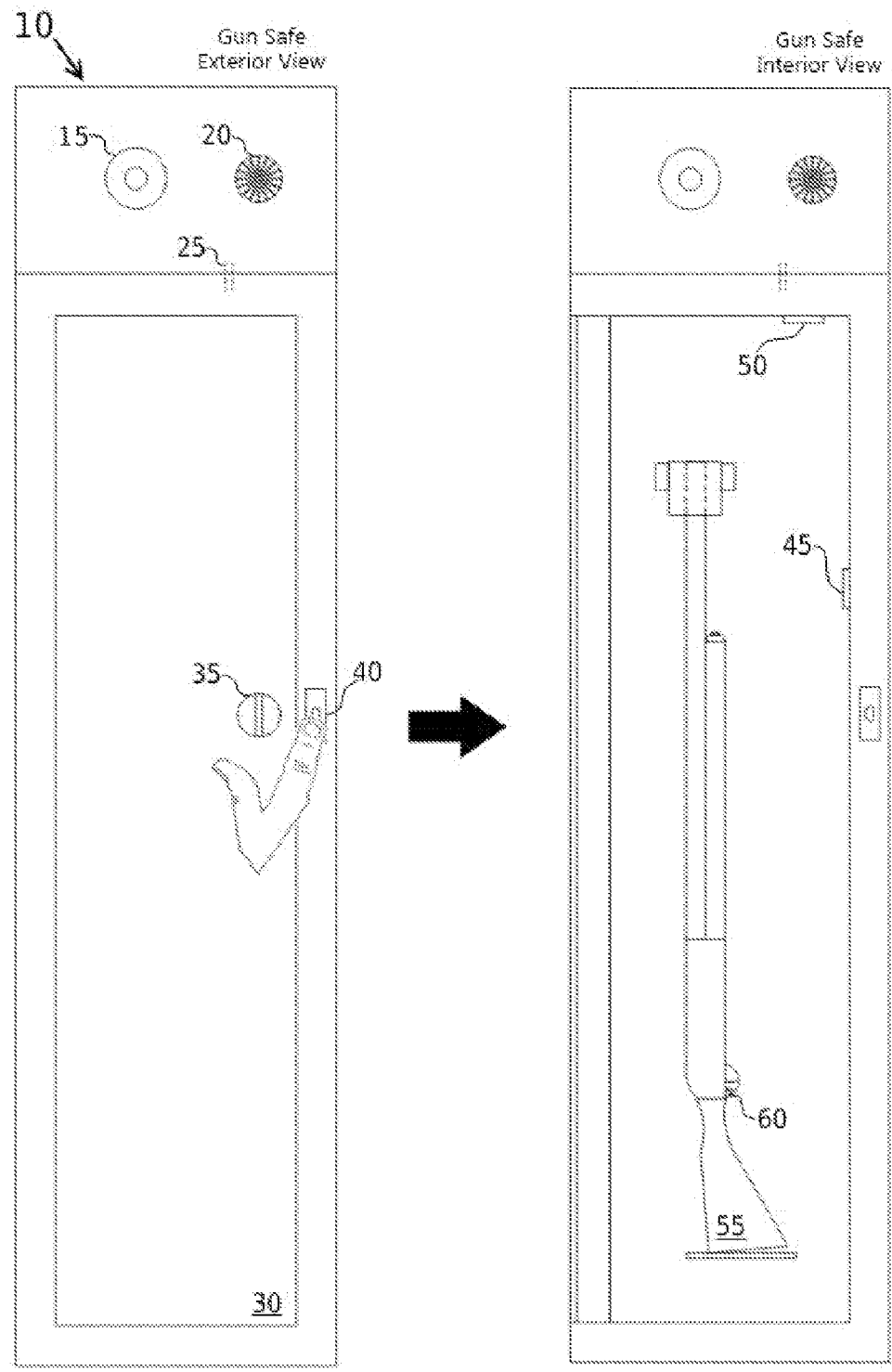
FIG. 1 conceptually illustrates a safe weapon container in some embodiments which receives a biometric input to open the interior of a gun safe.

By way of example, FIG. 1 conceptually illustrates a safe weapon container which receives a biometric input to open the interior of a gun safe. As shown in this figure, the safe weapon container 10 includes a surveillance camera 15, an audio intercom 20, a small aperture 25 (for wired or wireless data communications), a cabinet door 30, a door handle 35, and a biometric input device 40. A hand of a user is present about the biometric input device, with a finger positioned approximately over a fingerprint scanner. After the fingerprint is received, the surveillance camera 15 and audio intercom 20 are initiated to provide live audio and video feeds to a central monitoring facility. The live audio and video provides a second level of access authentication that ensures safe release of a defense weapon. In this example, the first level of access authentication is a fingerprint, which if matched to a stored fingerprint image of an authorized gun safe user, identifies the person attempting to access the defense weapon. The second level of access authentication occurs automatically by transmission of the live audio and video. When the central command facility receives the live audio and video streams, a monitoring agent (e.g., a person at central command) is able to determine whether the situation at the scene of the safe weapon container warrants immediate release of the defense weapon. For instance, the monitoring agent may see an armed attacker wounding innocent and unarmed victims, and may then release the defense weapon to the authorized user.

When the cabinet door 30 is open, the interior of the safe weapon container 10 is accessible. Within the interior, the safe weapon container 10 includes a door status contact device 45, a tamper switch 50, a defense weapon 55, and a delay release lock 60. The defense weapon can be a gun, a taser, a knife, etc. The weapon 55 in this example is a shot gun 55.

The surveillance camera 15 allows central command personnel to view the person requesting that the cabinet door 30 be opened to access the defense weapon 55. In some embodiments, the surveillance camera 15 is a high resolution IP surveillance camera. In some embodiments, the central command personnel have multiple views of the person, including close-up macro views of the biometric input of the person (e.g., fingerprint, retina, etc.), facial close-ups, and wider views of the whole person and the overall situation at the site of the safe weapon container 10. This enables the central command personnel to evaluate the situation and override the release of the gun if unnecessary.

The audio intercom 20 in some embodiments is a two-way audio receiver/transmitter between the site of the safe weapon container and the central command facility. The audio intercom 20 of some embodiments is activated once the biometric request is initiated. This allows the central command facility to immediately and conveniently communicate with the requester.

The small aperture 25 in some embodiments includes an IP communication interface for wired or wireless data communications. The IP communication interface allows communication to the central command center via the Internet. In some embodiments, the IP communication interface includes a program with a graphical user interface (GUI). In some embodiments, the program can be loaded on a mobile computing device, such as a mobile communications device or a tablet computing device, which displays the GUI when operating on the mobile device. The GUI includes information for the person requesting access to the gun safe. In some embodiments, the GUI includes a set of user tools that allow the person to input information. The user input is transmitted to the central command facility to allow the personnel to evaluate information posted by the person requesting access to the gun safe 10. In this way, an authorized user of the gun safe can be physically located more than reaching distance to the gun safe, yet can still obtain access to the gun safe. For instance, the person may be running into an emergency situation and simultaneously using a mobile device to ensure that the defense weapon is released upon arrival at the gun safe.

The biometric input device 40 of some embodiments is a reader that scans a unique pattern (e.g., a fingerprint, a retina, etc.) of the person accessing the gun safe 10. In some embodiments, the biometric input device 40 is a fingerprint reader for validating that the person requesting access to the gun safe is approved for gun use. By equipping a classroom with a secured gun cabinet holding a single shotgun 55, the teacher could access the shotgun through fingerprint identification technology.

The door status contact device 45 of some embodiments is a trigger which transmits a signal to the central command center as to whether the gun safe door has been opened. For example, after central command personnel release and the person tries to open the cabinet door 30, the door status contact device 45 may send a positive verification that the gun safe cabinet door 30 has been opened.

During any attempt to access the shot gun 55, the gun safe 10 determines the intended use of the gun. In some embodiments, the gun safe 10 does not release the gun for any unauthorized use (e.g., offensive or illegal). The tamper switch 50 of some embodiments notifies the central command center that someone is tampering with or attempting to gain unauthorized access to the gun safe. For example, an unauthorized user is attempting to open the gun safe door 30 without entering biometric authentication input, such as a fingerprint or retina scan. When the tamper switch 50 is activated in some embodiments, both video and audio is transmitted to the central command center. In this manner, the central command personnel can evaluate whether the unauthorized access is from an actual unauthorized user or simply due to a mistake by an authorized user.

The delay release lock 60 of some embodiments is a trigger lock that physically secures the shotgun 55 inside the safe weapon container 10 and, while the gun is secured, prevents the gun from being discharged in the safe weapon container 10. In some embodiments, the delay release lock 60 secures the gun for a period of time in order to allow the central command station to deny the release of the shot gun if warranted.

In addition to audio and video feeds, in some embodiments, two-way communication between a person accessing the shot gun and the central command facility is started. Moreover, authorities (e.g., police) are automatically notified and the surveillance camera starts recording and storing video and audio in a data storage device (i.e., a database).

Figure 2:
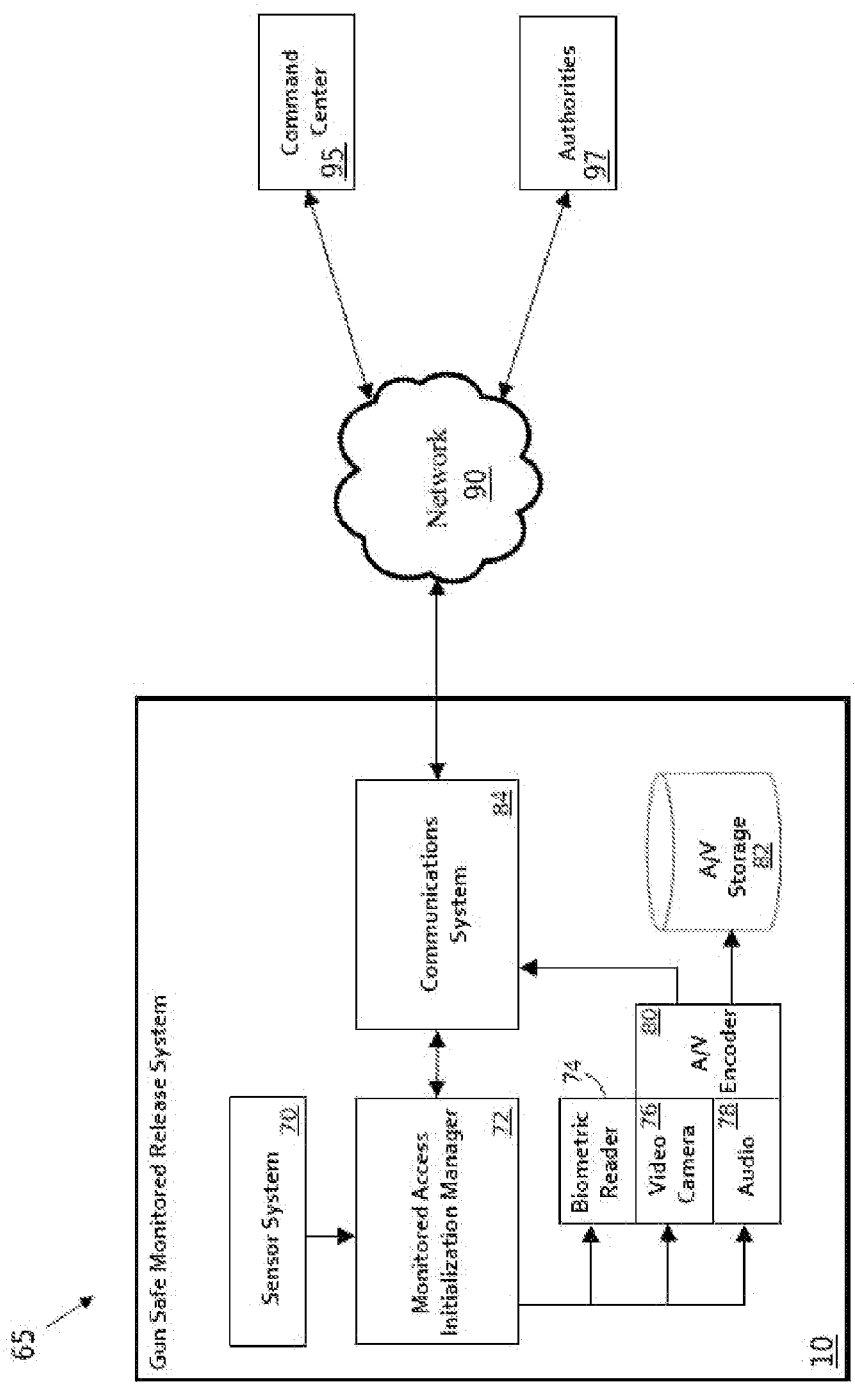
FIG. 2 conceptually illustrates a block diagram of a monitored release system of a gun safe that securitizes a defense weapon in some embodiments.

FIG. 2 conceptually illustrates a block diagram of a monitored release system of a gun safe that securitizes a defense weapon in some embodiments. As shown in this figure, the gun safe monitored release system 65 includes a safe weapon container (i.e., gun safe) 10 that is communicably connected over a network 90 to a central command facility 95 and one or more authorities 97. In particular, the gun safe 10 includes a sensor system 70, a monitored access initialization manager 72, a biometric reader 74, a video camera 76, audio intercom 78, an audio-visual (A/V) encoder 80, A/V storage 82, and a communications system 84. As there are no gun safes to date that have live video and audio communication with a central control facility, the benefits of automatically starting live video and audio communication with the central control facility are in allowing central command personnel to evaluate the situation.

Figure 3:
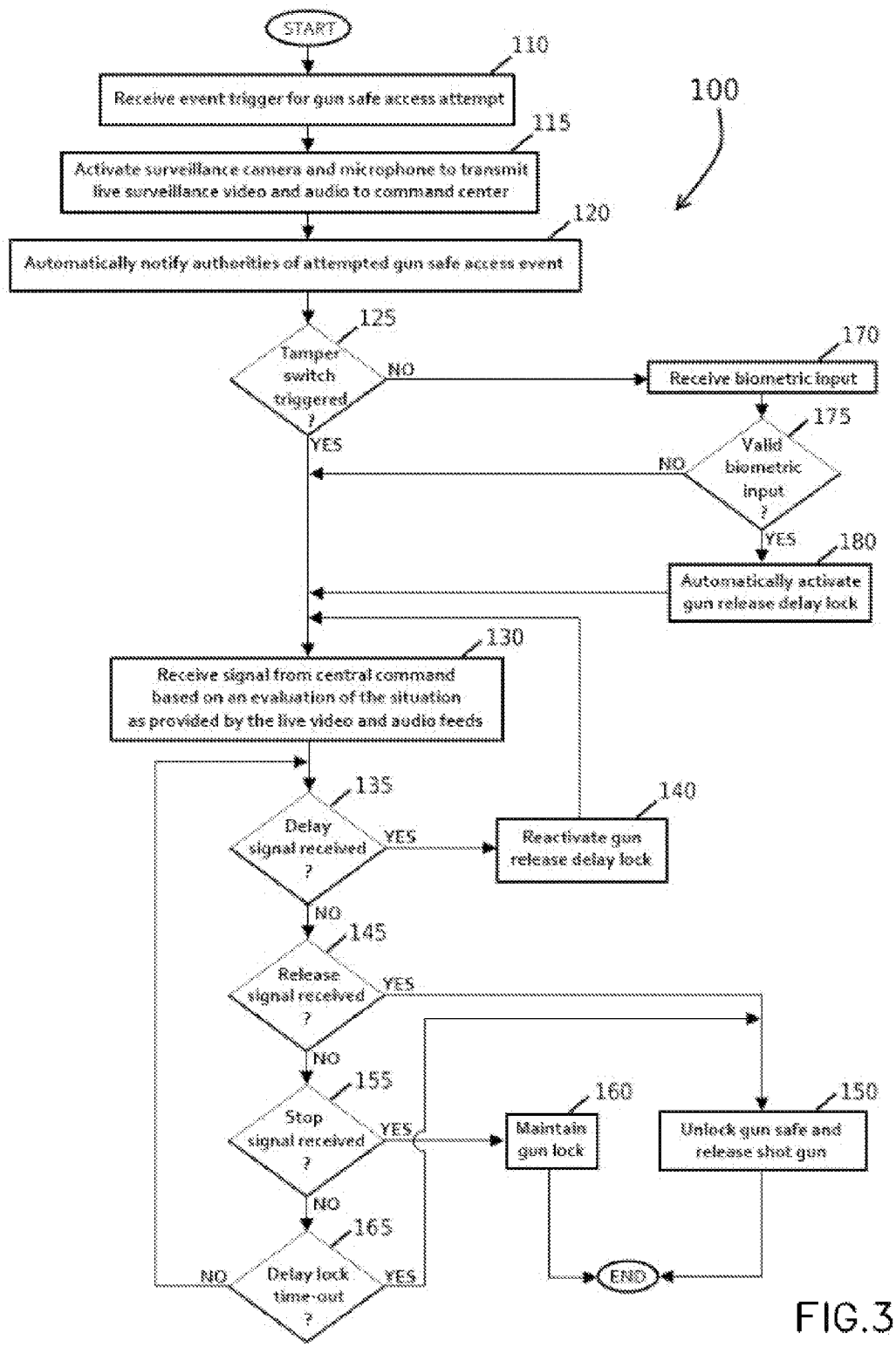
FIG. 3 conceptually illustrates a process for securitizing a defense weapon in a gun safe in some embodiments.

In some embodiments, the safe weapon container receives an input from the central command facility. In some embodiments, the input from the central command facility is a signal that is responsive to the biometric input for opening the gun safe. FIG. 3 conceptually illustrates a process for receiving access signals from a central command facility in securitizing a defense weapon in a gun safe in some embodiments. The process of some embodiments is performed by a program running on a processing unit embedded in an electronic system of the safe weapon container.

In some embodiments, the process 100 starts upon receiving (at 110) an event trigger associated with an attempted access of the gun safe. The attempted access may be a fingerprint scan, a retina scan, another type of biometric input, or a person physically handling (i.e., kicking, pushing, pulling, tilting, etc.) the gun safe. Whatever the cause of the trigger, in some embodiments the process activates (at 115) the surveillance camera and audio intercom to transmit lives video and audio to the central command center. In some embodiments, the process automatically notifies (at 120) the authorities of the attempted gun safe access. The authorities are notified whether the attempt is by an authorized person for a valid emergency situation, by an authorized person for an invalid, non-emergency situation, or by an unauthorized user.

In any event, the process does perform different sets of operations depending on the type of attempted access. Thus, the process 100 next determines (at 125) whether the tamper switch was triggered. If the tamper switch was triggered, the process waits to receive (at 130) a signal from the central command center, which is described in further detail below. On the other hand, if the process determines that the tamper switch was not triggered, then the attempted access must have been a biometric input.

In some embodiments, the process 100 receives (at 170) the biometric input. The biometric input may be a fingerprint, a retina scan, or some other biometric input that uniquely identifies an authorized user of the gun safe. However, any person can attempt to provide a biometric input in the hopes of inappropriately gaining authorized access. In doing so, the process determines (at 175) whether the biometric input is valid. In some embodiments, the process searches through a set of biometric data stored in a database of authorized user biometric structures. For example, the process may compare one or more characteristics, such as size, print diameter, print pattern, etc., present in an image of a person's fingerprint, with corresponding characteristics of a set of stored fingerprint images of authorized users. If the biometric input is not valid, the process transitions to 130, to receive a signal from central command, which is further described below. However, when the biometric input is valid, the process of some embodiments automatically activates (at 180) a gun release delay lock. The gun release delay lock is available in some embodiments to ensure that the defense weapon stored in the gun safe is only used for a valid emergency situation. For example, an authorized user can misjudge a situation or may even have an agenda to use the defense weapon for an improper use. The gun release delay lock of some embodiments allows central command to evaluate the scene (i.e., via the live audio and video streams) and make a determination whether to release or maintain the lock on the defense weapon.

The process 100 next receives (at 130) the signal from central command for how to proceed. In some embodiments, the signal is one of a delay signal, a release signal, and a stop signal. When a delay signal is received (at 135), the process performs at least one of signaling an error and a reactivation (at 140) of the gun release delay lock. Then the process transitions back to 130 to wait for another signal from central command. When a release signal is received (at 145), the process releases (at 150) the lock on the defense weapon (i.e., the person has full access to the gun). The process 100 of some embodiments ends after releasing the lock on the defense weapon. However, if the process did not receive a release signal, but instead received a stop signal (at 155), the process proceeds by maintaining (at 160) the lock on the defense weapon that is secured inside the gun safe (i.e., the gun safe does not release the gun). The process 100 of some embodiments ends after receiving the stop signal to maintain the gun lock. The process ends in this situation because central command has determined that an unauthorized user is attempting to access the defense weapon or an authorized user is attempting to access the defense weapon for an invalid, non-emergency situation.

In some embodiments, central command fails to provide a signal for how to proceed after a predetermined amount of time. In these cases, central command may be having difficulty evaluating the situation, or for other reasons may not be able to provide a signal that is received at the safe weapon container. In some embodiments, a predetermined amount of time is set for a time-out after which the defense weapon is released if no signal has been received from central command. In an emergency situation, the ability to access the defense weapon can mean the difference between life and death. Therefore, in some embodiments, the safe weapon container can operate independently from central command under a set of constraints that allow for release of the defense weapon. Thus, the gun may be released after the predetermined time without receiving a signal. This is beneficial because it makes the safe weapon container failsafe in emergency situations in which the central command personnel cannot or do not intercede and override the unlocking of the gun safe once a valid biometric request to open the gun safe is made. However, without a valid biometric input, the delay lock time-out has no effect. Thus, only an authorized user is able to access the defense weapon after the time-out expires without receiving a signal from central command. Furthermore, the central command personnel can still evaluate the situation after the time-out expires and the gun is released, thereby allowing all subsequent activities to be monitored and allowing the central command personnel to respond accordingly (e.g., inform the authorities of the authorized user's emergency use of a gun).

Figure 4:
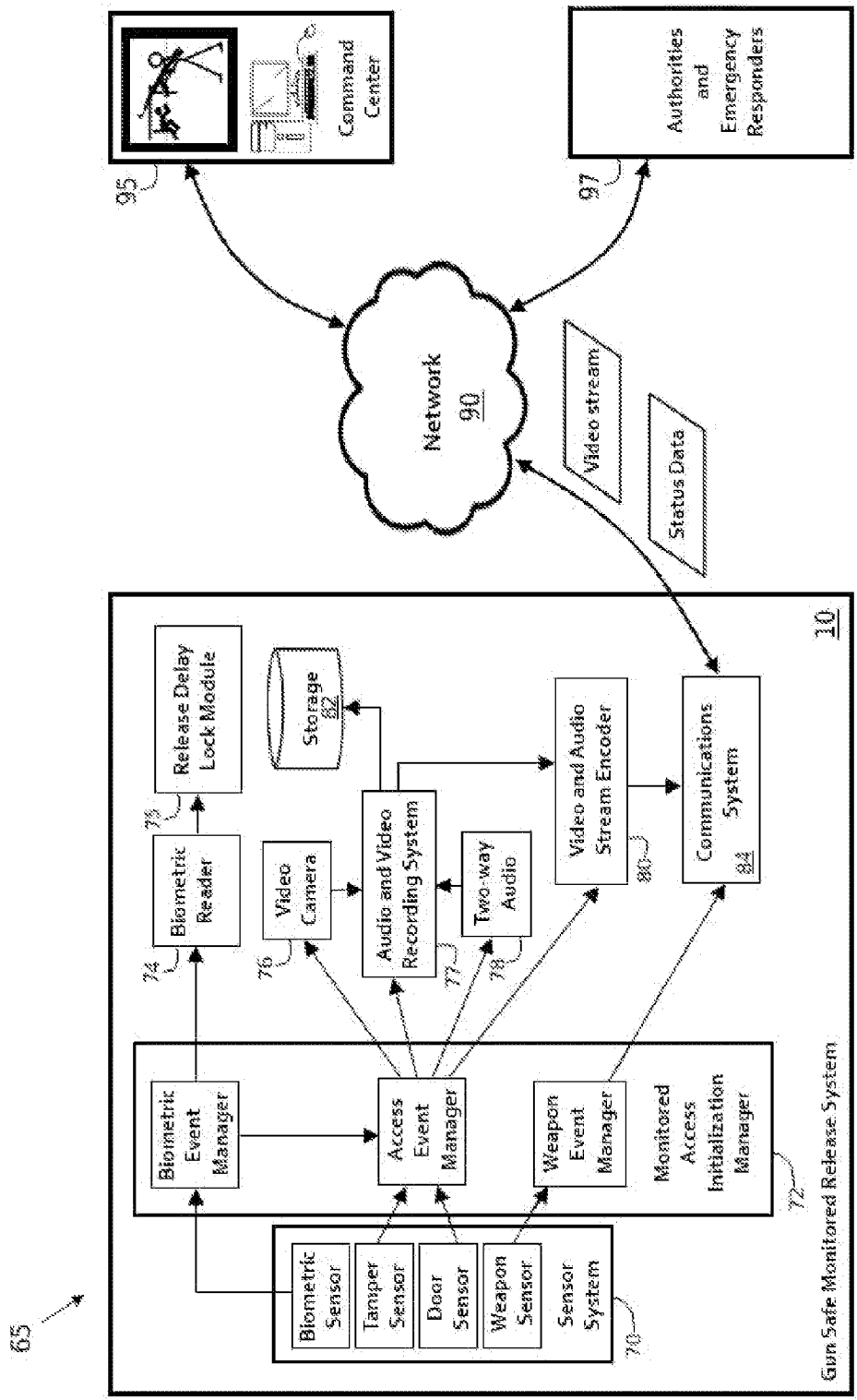
FIG. 4 conceptually illustrates another block diagram of a monitored release system of a gun safe that securitizes a defense weapon in some embodiments.

FIG. 4 conceptually illustrates another block diagram of a monitored release system of a gun safe that securitizes a defense weapon in some embodiments. The monitored release system 65 includes a number of sub-components of the monitored release system described above, by reference to FIG. 2. As shown in this figure, the sensor system 70 comprises a plurality of sensors including at least a biometric sensor, a tamper sensor, a door sensor, and a weapon sensor. The monitored access initialization manager 72 comprises a plurality of event managers including a biometric event manager, an access event manager, and a weapon event manager.

In some embodiments, the biometric sensor receives biometric input, such as a fingerprint or retina scan. For example, a user holds a finger up to a finger platform scanner located on the wall of the safe weapon container. When the biometric sensor identifies a biometric input, the biometric sensor transmits a signal to the biometric event manager. In some embodiments, the biometric event manager launches the biometric reader 74 if inactive. In some embodiments, the biometric reader starts the release delay lock module 75, to delay release of the gun upon receiving a valid biometric input.

In some embodiments, the tamper sensor identifies attempts to overcome the defense weapon lock and/or vandalize the gun safe. The tamper sensor notifies the access event manager of any such tampering. In some embodiments, the access event manager starts the video camera 76 and audio intercom 78, as well as an audio and video recording system 77, for saving recorded audio and video. The audio and video recording system 77 of some embodiments provides captured video and audio clips to a stream encoder 80 for transmission by the communications system 84 over the network 90 to the command center 95 and/or the authorities or emergency responders 97. The audio and video recording system 77 saves captured video and audio clips in the storage 82 (i.e., database). In some embodiments the recording system 77 stores raw (i.e., unprocessed and/or not encoded after native encoding by video camera capture device) video clips in the data storage 82. In some embodiments, the recording system 77 stores stream-encoded video and audio in the storage 82.

In some embodiments, the door sensor identifies the status of the cabinet door on the safe weapon container. For instance, the cabinet door may be open, closed and locked, or closed and unlocked, the status of which is instrumental for the effective use of the safe weapon container. The door sensor reports the status of the cabinet door to the access event manager, which performs initialization operations for each of the video camera 76, the audio and video recording system 77, the two-way audio 78, and the video and audio stream encoder 80, as described above.

In some embodiments, the weapon sensor receives weapon status inputs, such as movement of the defense weapon from the interior of the safe weapon container. When the weapon sensor identifies movement of the defense weapon, the weapon event manager is called which provides weapon status information to the communications system 84 for transmission to the command center 95.

Thus, in addition to third party verification (i.e., central command) prior to unlocking the gun safe, live video and audio feeds, and other communication, the gun safe of some embodiments also stores the video and audio, manages events, includes a plurality of sensors for any of several input events, and streams any or all of the events recorded to the central command facility and/or the authorities. This provides a set of records (i.e., audio recording, video recording, GUI interface inputs, etc.) of each event. In this manner, the gun safe acts like a black box on a plane.

Figure 5:
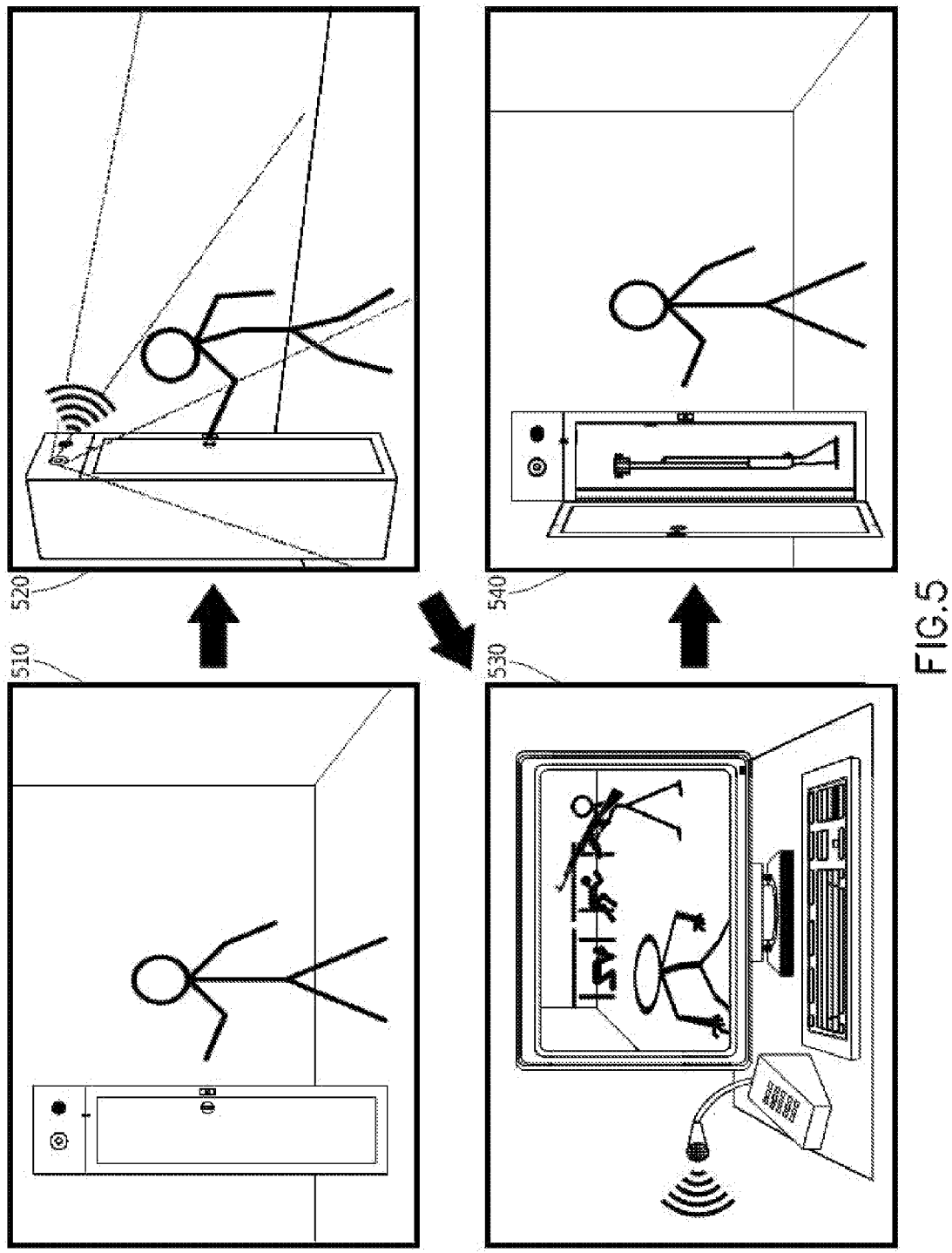
FIG. 5 conceptually illustrates an example of an authorized user accessing a shotgun from the interior of a safe weapon container during an emergency.

FIG. 5 conceptually illustrates an example of an authorized user accessing a shotgun from the interior of a safe weapon container during an emergency. This example usage of a safe weapon container is illustrated over four phases 510-540. In the first phase 510, a person in a room is approaching a safe weapon container. As shown, the safe weapon container includes a video camera and a two-way audio intercom at the top of the safe weapon container. There is also a biometric input device near the cabinet door handle for the safe weapon container.

In the second phase 520, the person is attempting to access the safe weapon container. In particular, the user is holding a finger up to the biometric input device in order to have a fingerprint scanned. Upon identifying the access attempt, the safe weapon container automatically starts capturing live video (as shown by the dashed lines) and audio (as shown by the curved semi-circles). Although not shown in this phase, the captured video and audio is contemporaneously being streamed to a central command facility for monitoring by central command personnel.

In the third phase 530, live video is being shown on a monitor at the central command facility. As shown in the video, an armed gunman is standing in the room while children are ducking under tables and desks. The person attempting to access the defense weapon in the safe weapon container is shown in the foreground of the video with arm held out and finger touching the biometric input device. In addition, live audio from the scene is being transmitted to the central command center, as shown by the curved semi-circles coming out of the speaker.

Next, in the fourth phase 540, the cabinet door of the safe weapon container has been opened. The person is an authorized user, since the fingerprint provided by the person was matched to an authorized user's print in the database. Also, the authorized user was granted emergency access to the gun by central command, based on its evaluation of the danger at the site and the immediate need for the authorized user to use lethal force on the armed gunman.

Figure 6:
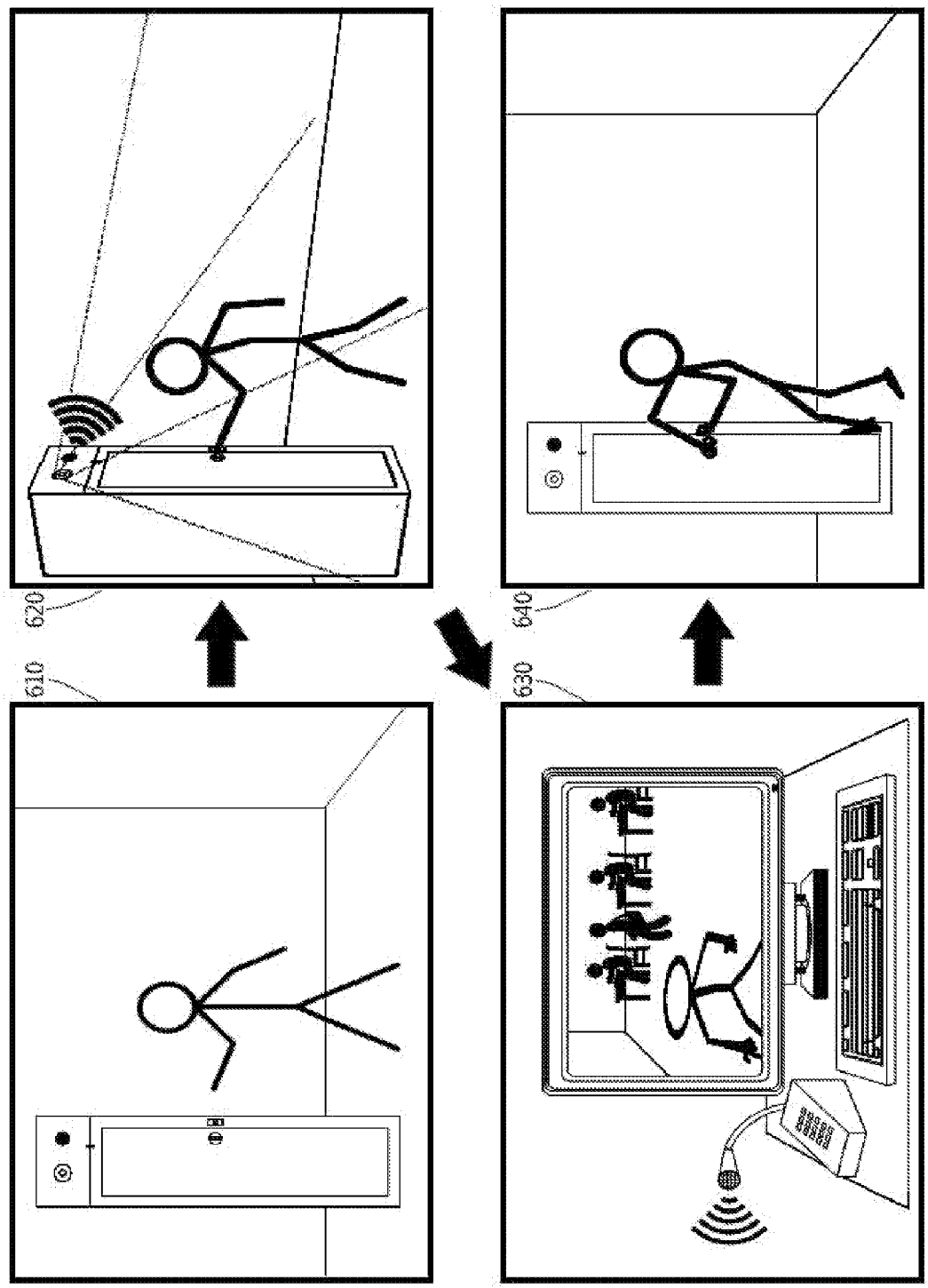
FIG. 6 conceptually illustrates an example of a user being denied access to a shotgun after a central command facility reviews live audio and video of a non-emergency scene.

In contrast to the allowed access to the defense weapon in the FIG. 5 usage example, FIG. 6 conceptually illustrates an example of a user being denied access to a shotgun after the central command facility reviews live audio and video of a non-emergency scene. This example usage of a safe weapon container is illustrated over four phases 610-640. In the first phase 610, a person in a room is approaching a safe weapon container. When the person inputs a fingerprint, as shown in the second phase 620, the video camera begins recording video and the audio intercom is started for two-way communication with central command.

In the third phase 630, live video is being shown on a monitor at the central command facility. As shown in the video, students are seated at desks in a classroom and one student appears to be walking somewhere (e.g., to desk, out of class, etc.). No emergency situation appears anywhere in the video and the audio is in constant communication with the site. The person attempting to access the defense weapon in the safe weapon container is shown in the foreground of the video with arm held out and finger touching the biometric input device.

Next, in the fourth phase 640, the cabinet door of the safe weapon container remains closed and the safe weapon container continues to be locked. The person may be an unauthorized user or an authorized user trying to access the shot gun for an invalid use (i.e., no emergency). Thus, the person is shown struggling with the handle of the cabinet door, with no apparent way to open the door and gain access to the shot gun stored in the interior of the safe weapon container. In this way, the safe weapon container prevents unauthorized use of the defense weapon, only making it available in emergency situations that warrant use of a lethal weapon, such as a shot gun.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention program, when installed to operate on one or more electronic systems, define one or more specific machine implementations that execute and perform the operations of the software programs.

Figure 7:
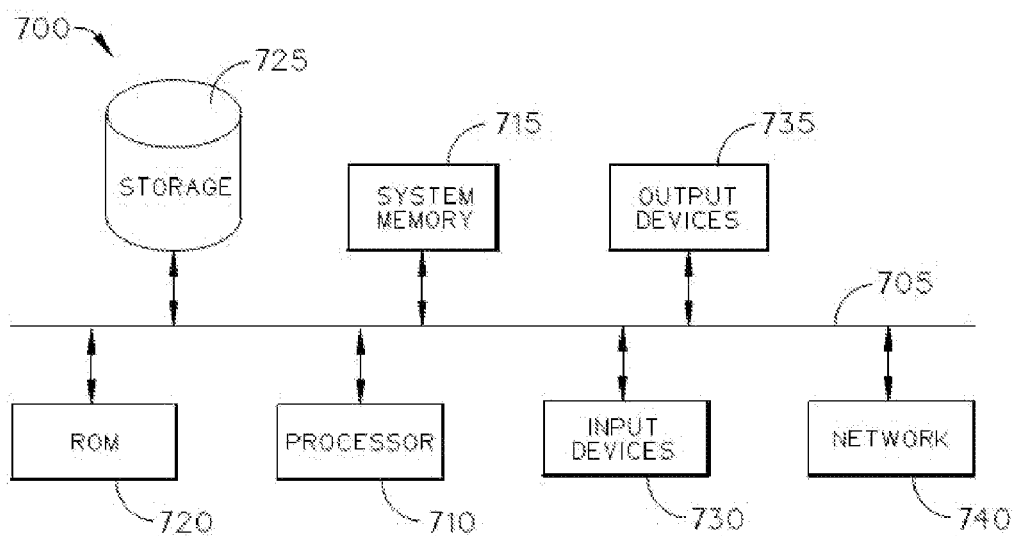
FIG. 7 conceptually illustrates an electronic system with which some embodiments of the invention are implemented.

FIG. 7 conceptually illustrates an electronic system 700 with which some embodiments of the invention are implemented. The electronic system 700 may be a computer, phone, PDA, or any other sort of electronic device. Such an electronic system includes various types of computer readable media and interfaces for various other types of computer readable media. Electronic system 700 includes a bus 705, processing unit(s) 710, a system memory 715, a read-only 720, a permanent storage device 725, input devices 730, output devices 735, and a network 740.

The bus 705 collectively represents all system, peripheral, and chipset buses that communicatively connect the numerous internal devices of the electronic system 700. For instance, the bus 705 communicatively connects the processing unit(s) 710 with the read-only 720, the system memory 715, and the permanent storage device 725.

From these various memory units, the processing unit(s) 710 retrieves instructions to execute and data to process in order to execute the processes of the invention. The processing unit(s) may be a single processor or a multi-core processor in different embodiments.

The read-only-memory (ROM) 720 stores static data and instructions that are needed by the processing unit(s) 710 and other modules of the electronic system. The permanent storage device 725, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 725.

Other embodiments use a removable storage device (such as a floppy disk or a flash drive) as the permanent storage device 725. Like the permanent storage device 725, the system memory 715 is a read-and-write memory device. However, unlike storage device 725, the system memory 715 is a volatile read-and-write memory, such as a random access memory. The system memory 715 stores some of the instructions and data that the processor needs at runtime. In some embodiments, the invention's processes are stored in the system memory 715, the permanent storage device 725, and/or the read-only 720. For example, the various memory units include instructions for processing appearance alterations of displayable characters in accordance with some embodiments. From these various memory units, the processing unit(s) 710 retrieves instructions to execute and data to process in order to execute the processes of some embodiments.

The bus 705 also connects to the input and output devices 730 and 735. The input devices enable the user to communicate information and select commands to the electronic system. The input devices 730 include alphanumeric keyboards and pointing devices (also called "cursor control devices"). The output devices 735 display images generated by the electronic system 700. The output devices 735 include printers and display devices, such as cathode ray tubes (CRT) or liquid crystal displays (LCD). Some embodiments include devices such as a touchscreen that functions as both input and output devices.

Finally, as shown in FIG. 7, bus 705 also couples electronic system 700 to a network 740 through a network adapter (not shown). In this manner, the computer can be a part of a network of computers (such as a local area network ("LAN"), a wide area network ("WAN"), or an Intranet), or a network of networks (such as the Internet). Any or all components of electronic system 700 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

Figure 8:
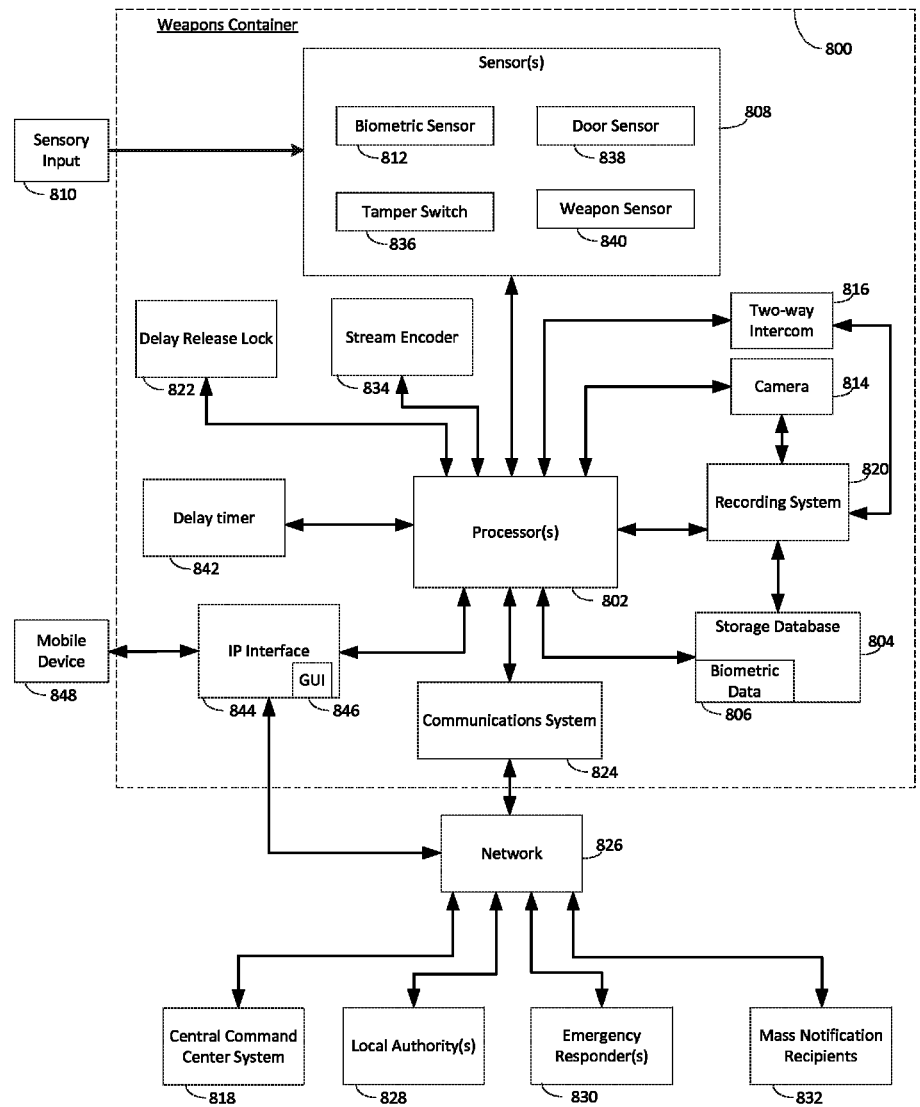
FIG. 8 conceptually illustrates a block diagram of another embodiment for a weapons container in communication with a network.

Turning now to FIG. 8, another embodiment of a weapons container 800 is shown. The weapons container 800 is configured to store a defense weapon (not shown) therein and release the defense weapon to an authorized user. The defense weapon may be any type of defense armament, including lethal and non-lethal weaponry. In some embodiments, the weapons container 800 may be configured to store a plurality of lethal and/or non-lethal defense weapons. It is noted that the weapons container 800 described below may comprise any combination of functions and elements provided in the preceding descriptions.

The weapons container 800 may comprise a cabinet with a cabinet door, such as the cabinet door 30 as shown in FIG. 1. An interior of the cabinet may be hollow and adapted to securely receive one or more defense weapons. For instance, the interior may contain various securing mechanisms, such as hooks, brackets, stands, shelfs, and the like, to securely hold the defense weapon(s). Referring back to FIG. 8, the weapons container 800 may further include one or more processors 802 and a storage database 804 that is communicatively coupled with and readable by the one or more processors 802. The storage database 804 may store processor-readable instructions and/or other data, such as biometric data 806, as described further below.

Still referring to FIG. 8, the weapons container 800 includes one or more sensors 808 for detecting one or more sensory input 810. For instance, in one embodiment, the weapons container 800 includes a biometric sensor 812 that detects a fingerprint input from a user. The weapons container 800 may further include a camera 814 that captures a live video upon detection of the fingerprint input. A two-way audio intercom 816 may be configured to provide live audio communication with a central command center system 818 upon detection of the fingerprint input. It is contemplated that the one or more sensors 808, the camera 814, and the two-way audio intercom 816 are in operative communication with the one or more processors 802, which may initiate various operations of the sensors 808, the camera 814, and the two-way intercom 816. The weapons container 800 further includes a recording system 820 in operative communication with the one or more processors 802, the camera 814, and/or the two-way intercom 816. The recording system 820 saves at least a portion of the live video and/or the live audio to the storage database 804 or to a separate memory (not shown). The live video and/or audio may be raw data received directly from the camera 814 and the two-way intercom 816, or may be raw or processed data received through the processor 802. In another aspect, it is contemplated that the streamed live video and audio are further recorded at the central command center system 818.

Referring yet against to FIG. 8, the weapons container 800 includes a delay release lock 822, such as the delay release lock 60 shown in FIG. 1. It is contemplated that the delay release lock 822 secures the defense weapon for a predetermined amount of time and releases the defense weapon in response to a command signal received from the central command center system 818. More particularly, the delay release lock 822 is in communication with the one or more processors 802, which may instruct the lock 822 to operate under various parameters based on the signal from the central command center system 818. The signal may be a delay signal that causes the one or more processors 802 to reset a delay timer 842 and wait for another signal from the central command center system 818 before releasing the delay release lock 822. The signal may also comprise a release signal, whereby the one or more processors 802 operate the delay release lock 822 to release the defense weapon. Further, the signal may comprise a stop signal, whereby the one or more processors 802 operate the delay release lock 822 to maintain securement of the defense weapon. Even further, it is contemplated that the delay release lock 822 can release the defense weapon after a predetermined amount of time if no command signal is received from the central command center system 818 and if the biometric input is determined valid. In some embodiments, the predetermined amount of time is a delay time between about 5 seconds to about 25 seconds. More preferably, the delay time is between about 10 seconds to about 20 seconds. Most preferably, the delay time is about 15 seconds. It is further contemplated that a plurality of delay release locks 822, delay timers 842, and a variety of signals may be provided to individually secure and provide timed release of a plurality of defense weapons stored within the weapons container 800. In another aspect, a single delay release lock 822 may secure more than one defense weapon.

Further shown in FIG. 8, the one or more processors 802 is coupled to a communications system 824 at the weapons container 800. The communications system 824 is adapted to connect the one or more processors 802 to a network 826, such as the Internet, 3G, 4G, and the like, so that the one or more processors 802 can communicate with the central command center system 824, which may be located remotely from the weapons container 800 at a different or same building location; a local authority system 828, such as a system at a local police station; an emergency responder system 830, such as a system at a local 911 call facility or emergency medical team; and/or a plurality of other recipients referred to herein as mass notification recipients 832. For instance, the communications system 824 may receive the command signal for the delay release lock 822 from the central command center system 818 over the network 826, and further deliver the signal to the one or more processors 802 for operation of the delay release lock 822. In another aspect, upon detection of the fingerprint input by the biometric sensor 812, the communications system 824 may facilitate the one or more processors 802 in notifying the local authority system 828, such as communications systems at a local police station, and/or the emergency responders 830 of an attempted access to the weapons container 800. The fingerprint or biometric input may further be sent to the central command center system 818, or any of the other recipients 828, 830, 832, over the network 826. The communications system 824 may further stream the live video and the live audio to at least one of the central command center system 818, the local authority system 828, the emergency responders 830, and the mass notification recipients 832, over the network 826. It is contemplated that the mass notification recipients 832 may include communications devices, such as mobile phones, computers, news stations, and the like, associated with various individuals or groups in the vicinity of the weapons container 800 or potentially affected by a situation arising from the attempted access at the weapons container 800. For instance, the communications system 824 may send text messages, e-mail, tweets, and/or other forms of electronic communication to individuals and/or parents of the individuals located within a building that secures the affected weapons container 800.

Still referring to FIG. 8, the weapons container 800 may comprise a stream encoder 834 for converting the live video and the live audio into a different format for streaming. In some embodiments, the stream encoder 834 may convert the video and audio files into various formats readily digestible by the central command center system 818, the local authorities 828, the emergency responders 830, and the mass notification recipients 832, which may all require different formatting. In other embodiments, the stream encoder 834 further decodes various signals and/or data received from those entities through the communications system 824. Further, the stream encoder 834 may be capable of encrypting and/or decrypting video and audio files, as well as other text and data files.

In another aspect, it is contemplated that the one or more processors 802 determine a valid or invalid status of the biometric input received at the biometric sensor 812, such as the fingerprint input, and send the valid or invalid status to the central command center system 818 through the communications system 824. It is contemplated the biometric input is determined valid or invalid by the one or more processors 802 that compare one or more characteristics of the input to a set of biometric data stored in the storage database 804. Further, it is contemplated that the communications system 824 sends the biometric input to the central command center 818, the local authorities 828, the emergency responders 830, and/or the mass notification recipients 832.

Still referring to FIG. 8, the sensors 808 at the weapons container 800 include a tamper switch 836 coupled to the one or more processors 802. When the tamper switch 836 detects an unauthorized access to the weapons container 800, the one or more processors 802 operate the camera 814 and the two-way audio intercom 816 to capture the live video and the live audio, respectively. The one or more processors 802 may further notify the central command center 818 of the unauthorized access and transmit the live video and the live audio through the network 826 to the central command center system 818, the local authorities 828, the emergency responders 830, and the mass notification recipients 832. In one aspect, an unauthorized access may be triggered by a user attempting to open the weapons container 800 without inputting biometric data. For instance, the unauthorized user may be attempting to break into the weapons container 800 by damaging a component of the container 800 and/or repeatedly trying to open the cabinet door 30.

Referring yet again to FIG. 8, the sensors 808 may include a door sensor 838, such as a door status device that is coupled to the one or more processors 802. When the door status device detects that the cabinet door 30 is opened, the one or more processors 802 sends one or more notifications, audio, and/or video through the communications system 824 and the network 826 to one or more of the recipients 818, 828, 830, 832. Merely by way of example, a notification may include information that the cabinet door 30 has been opened and whether the access is authorized or not. In another aspect, it is contemplated that the door sensor 838 detects when a user is near the weapons container 800. The door sensor 838 may comprise an infrared or heat sensor, a light sensor, a motion sensor, an odor sensor, a chemical sensor, or any other sensor or mechanical device that is triggered when disrupted by a user.

In another aspect, the sensors 808 at the weapons container 800 further include a weapon sensor 840. The weapons sensor 840 identifies movement of the defense weapon(s) from the interior of the weapons container. When movement is detected, the one or more processors 802 notify at least one of the central command center system 818, the local authority system 828, the emergency responder system 830, and the mass notification recipients 832 of the movement. In one embodiment, the weapons sensor 840 detects a fluctuation or lack of weight associated with the weapon when the weapon is moved. In another embodiment, the weapon sensor 840 is a mechanical device that is disrupted upon movement of the weapon.

Still referring to FIG. 8, the weapons container 800 may further include an Internet communication interface, such as an IP interface 844 coupled to the one or more processors 802 and having a program with a graphical user interface ("GUI") 846. The GUI 846 and/or IP interface 844 may be configured to receive a user input from a mobile device 848 and/or other remote device, such as a cell phone or a laptop computer. The GUI 846 and/or the IP interface 844 transmits the user input to the central command center system 818 through the network 826. In other embodiments, the one or more processors 802 receive the user input from the mobile device 848 for further processing and/or transmitting. It is contemplated that the user input may comprise any type of data, such as video, pictures, text, and the like. Merely by way of example, in practice, individuals near the weapons container 800 who witness suspicious activity may alert the one or more processors 802 and/or the recipients 818, 828, 830, 832. The one or more processors 802 may initiate operation of the camera 814 and/or two-way intercom 816.

Figure 9:
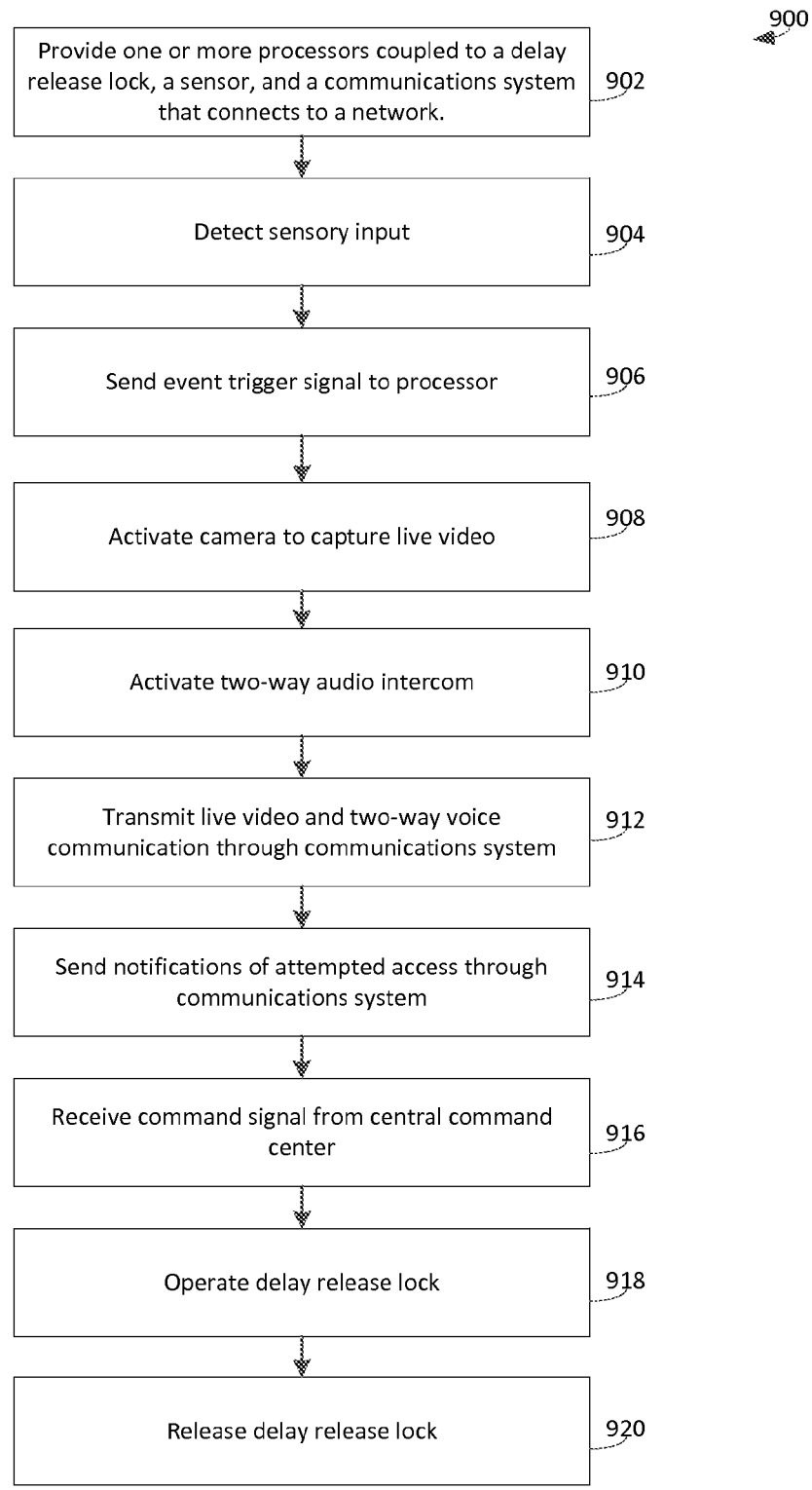
FIG. 9 conceptually illustrates a method for operating a delay release lock according to various embodiments of the present invention.

Turning now to FIG. 9, a method 900 for operating the delay release lock 822 secured to the defense weapon stored in the weapons container 800 is provided. The method 900 includes providing 902, at the weapons container 800, the one or more processors 802 coupled to the delay release lock 822, the one or more sensors 808, and the communications system 824 that is connected to the network 826. The method 900 includes the step of detecting 904 by the sensor 808 a sensory input based on an attempted access to the weapons container 800. Further, the method 900 includes sending 906, by the sensor, an event trigger signal to the processor 802 upon detection of the sensory input; activating 908, by the one or more processors 802 upon receiving the event trigger signal, the camera 814 to capture the live video; and activating 910, by the one or more processors 802 upon receiving the event trigger signal, the two-way audio intercom 816 to send and receive live audio with the central command center system 818. In another aspect, the method 900 includes the step of transmitting 912, by the one or more processors 802 through the communications system 824, the live video and the live audio to at least one of the central command center system 818, the local authority system 828, the emergency responder system 830, and/or the mass notification recipients 832. In a further aspect, the method 900 includes the steps of notifying 914, by the one or more processors 802 through the communications system 818, at least one of the local authority system 828 and the emergency responder system 830 of the attempted access and receiving 916, by the one or more processors 802 through the communications system 818, a command signal from the central command center system 818. The command signal comprises at least one of a delay signal, a release signal, and a stop signal. The method 900 may further include operating 918, by the one or more processors 802, the delay release lock 822 secured to the defense weapon based on the command signal. In some cases, the method 900 includes releasing 920, by the one or more processors 802, the delay release lock 822 after a predetermined amount of time, such as the delay time described previously, if no command signal is received from the central command center system 818 and if the biometric input is determined to be valid.

In other embodiments, the method 900 may further include the step of resetting, by the one or more processors 802, the delay timer 842 upon receiving the delay signal from the central command center system 818. In another aspect, upon receiving the release signal from the central command center system 818, the one or more processors 802 may unlock the weapons container 800 and release the delay release lock 822 to allow access to the defense weapon. Further, in a different aspect, the central command center system 818 may determine that the attempted access is at least one of an unauthorized access, such as when the tamper switch 836 is activated, and an invalid attempt, such as when the biometric input is determined to be invalid. In that case, the central command center system 818 may send the stop signal to the communications system 824 and the one or more processors 802 may maintain the delay release lock 822 on the defense weapon upon receiving the stop signal.

In a different aspect, the method 900 further comprises determining, by the one or more processors 802, if the sensory input received at one or more of the sensors 808 is biometric input received at the biometric sensor 812 or tamper input received at the tamper switch 836. Further, the method 900 may comprise automatically notifying, by the one or more processors 802 through the communications network 826, at least one of the local authority system 828 and the emergency responder system 830 that the attempted access is at least one of an authorized attempt for a valid emergency situation, an authorized attempt for an invalid non-emergency situation, and an unauthorized attempt. The method 900 may further comprise recording the live video and the live audio at the weapons container 800 by the recording system 820.

While the invention has been described with reference to numerous specific details, one of ordinary skill in the art will recognize that the invention can be embodied in other specific forms without departing from the spirit of the invention. For example, a process is conceptually illustrated in FIG. 3. The specific operations of this process may not be performed in the exact order shown and described. Specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details and examples, but rather is to be defined by the appended claims.

What is claimed is:

1. A weapons container for releasing a defense weapon to an authorized user, comprising:
    a cabinet having a cabinet door and an interior configured to securely receive a defense weapon therein;
    a door sensor in operative communication with the cabinet door, wherein the door sensor comprises at least one of an infrared or heat sensor, a light sensor, a motion sensor, an odor sensor, and a chemical sensor;
    one or more processors;
    a storage database communicatively coupled with and readable by the one or more processors and having stored therein processor-readable instructions;
    a biometric sensor that detects a fingerprint input from a user;
    a camera that captures a live video upon detection of the fingerprint input;
    a two-way audio intercom that provides live audio communication with a central command center system upon detection of the fingerprint input;
    a recording system that saves at least a portion of the live video or the live audio to the storage database;
    a delay release lock that secures the defense weapon for a predetermined amount of time and releases the defense weapon in response to a signal from the central command center system, wherein the predetermined amount of time is at least about 5 seconds and is activated by a biometric reader upon receiving a valid fingerprint input at the biometric sensor;
    an IP communication interface coupled to the one or more processors and having a program with a graphical user interface ("GUI"), wherein the GUI receives user input from a mobile device and transmits the user input to the central command center system;
    a stream encoder configured to encrypt and decrypt at least a portion of the live video, live audio, and text files; and
    a communications system coupled with the one or more processors and connected over a network to the central command center system, a local authority system, and an emergency responder system, wherein the communications system:
notifies at least one of the local authority system, mass notification recipients, and the emergency responder system upon detection of the fingerprint input, wherein the mass notification recipients comprise at least one of a plurality of mobile phones, computers, and news stations,
streams the live video and the live audio to at least one of the central command center system, the local authority system, and the emergency responder system over the network, and
sends out at least one of text messages, e-mails, and tweets.

2. The weapons container of claim 1, the stream encoder converts the live video and the live audio into a different format for streaming.

3. The weapons container of claim 1, wherein the one or more processors determine a valid or invalid status of the fingerprint input and send the valid or invalid status to the central command center system.

4. The weapons container of claim 1, further comprising a tamper switch coupled to the one or more processors, wherein when the tamper switch detects an unauthorized access to the weapons container, the one or more processors:
operate the camera and the audio intercom to capture the live video and the live audio, respectively;
notify the central command center system of the unauthorized access; and
transmit the live video and the live audio to at least one of the central command center system, the local authority system, and the emergency responder system.

5. The weapons container of claim 1, wherein the door sensor is coupled to the one or more processors, wherein when the door sensor detects that the cabinet door is opened, the one or more processors notify at least one of the central command center system, the local authority system, and the emergency responder system of the detected open door.

6. The weapons container of claim 1, further comprising a weapon sensor coupled to the one or more processors, wherein when the weapon sensor identifies movement of the defense weapon from the interior of the weapons container, the one or more processors notify at least one of the central command center system, the local authority system, and the emergency responder system of the movement.

7. The weapons container of claim 1, wherein the signal from the central command center system is received by the one or more processors through the communications system and comprises at least one of:
a delay signal, wherein the one or more processors reset a delay timer and wait for another signal from the central command center system,
a release signal, wherein the one or more processors operate the delay release lock to release the defense weapon, and
a stop signal, wherein the one or more processors operate the delay release lock to maintain securement of the defense weapon.

8. A monitoring system for a weapons container that securitizes a defense weapon, comprising:
one or more processors;
a storage database communicatively coupled with and readable by the one or more processors and having stored therein processor-readable instructions;
a sensor system that detects an attempted access at the weapons container, wherein the sensor system includes a door sensor that comprises at least one of an infrared or heat sensor, a light sensor, a motion sensor, an odor sensor, and a chemical sensor;
a camera that captures a live video upon detection of the attempted access;
a two-way audio that provides live audio communication with a central command center system upon detection of the attempted access;
a recording system that captures the live video and the live audio for storage in the storage database;
a delay release lock module that delays release of the defense weapon for a predetermined period of time upon receiving a valid attempted access and releases the defense weapon after lapse of the predetermined period of time if no signal is received from the central command center in response to the valid attempted access, wherein the predetermined period of time is at least about 5 seconds;
an IP communication interface coupled to the one or more processors and having a program with a graphical user interface ("GUI"), wherein the GUI receives user input from a mobile device and transmits the user input to the central command center system;
a stream encoder configured to encrypt and decrypt at least a portion of the live video, live audio, and text files; and
a communications system connected to a network, wherein the communications system:
notifies, over the network, at least one of a local authority system, mass notification recipients, and an emergency responder system upon detection of the attempted access, wherein the mass notification recipients comprise at least one of a plurality of mobile phones, computers, and news stations,
streams, over the network, the live video and the live audio to the central command center system and to the at least one local authority and emergency responder, and
sends, over the network, at least one of text messages, e-mails, and tweets.

9. The monitoring system of claim 8, wherein the sensor system includes a biometric sensor in communication with the one or more processors,
wherein the biometric sensor receives a biometric input, and
wherein the biometric input is determined valid or invalid by the one or more processors that compare one or more characteristics of the biometric input to a set of biometric data stored in the storage database.

10. The monitoring system of claim 9, wherein the one or more processors coupled to the communications system:
notify the central command center system of the determination of the biometric input;
receive a command signal from the central command center system; and
operate a delay release lock securing the defense weapon upon receiving the command signal.

11. The monitoring system of claim 8, wherein the sensor system includes a biometric input device that receives a fingerprint input.

12. The monitoring system of claim 8, wherein the sensor system includes a biometric input device that receives a biometric input and the communications system sends the biometric input to the central command center system.

13. A method for releasing a defense weapon from a weapons container to a user, comprising:
detecting, by a sensor system, a sensed input, wherein the sensor system includes a door sensor that comprises at least one of an infrared or heat sensor, a light sensor, a motion sensor, an odor sensor, and a chemical sensor;

detecting, by a biometric sensor, a biometric input based on an attempted access at the weapons container;

after detecting the biometric input, capturing, by a camera, a live video of the attempted access at the weapons container;

after detecting the biometric input, sending and receiving, by a two-way audio intercom, live audio communication with a central command center system;

activating, by a biometric reader in communication with the biometric sensor, a delay release timer to delay release of the defense weapon for a predetermined period of time upon receiving a valid biometric input, wherein the predetermined period of time is at least about 5 seconds;

encrypting and decrypting, by a stream encoder, the live video and the live audio;

notifying, by one or more processors at the weapons container, at least one of a local authority system, mass notification recipients, and an emergency responder system of the attempted access, wherein the mass notification recipients comprise at least one of a plurality of mobile phones, computers, and news stations;

receiving, by the one or more processors at the weapons container, a signal from the central command center system for releasing the defense weapon from the weapons container;

operating, by the one or more processors at the weapons container, a delay release lock secured to the defense weapon based on the signal, wherein:
  in response to a delay signal, the one or more processors reset the delay timer and wait for another signal from the central command center system,
  in response to a release signal, the one or more processors operate the delay release lock to release the defense weapon, and
  in response to a stop signal, the one or more processors operate the delay release lock to maintain securement of the defense weapon; and sending, by a communication system, notifications comprising at least one of text messages, e-mails, and tweets.

14. The method of claim 13, further comprising:
transmitting, by the one or more processors at the weapons container, the live video to at least one of the central command center system, the local authority system, and the emergency responder system.

15. The method of claim 13, further comprising:
recording, by a recording system in operative communication with the camera and the two-way audio intercom, at least a portion of the captured live video and the live audio communication to a storage database.

16. The method of claim 13, further comprising:
after detecting the biometric input or the sensed input, automatically notifying, by the one or more processors at the weapons container, at least one of the local authority system and the emergency responder system that the attempted access is at least one of an authorized attempt and an unauthorized attempt.

17. The method of claim 13, further comprising:
unlocking, by the one or more processors at the weapons container, the weapons container to permit access to the defense weapon.

18. The method of claim 16, wherein the sensed input is detected by at least one of the door sensor, a tamper switch, and a weapon sensor.

19. The method of claim 13, wherein the notifications comprise information indicating whether the attempted access is authorized or unauthorized.

20. The method of claim 13, wherein the delay release lock is secured to a plurality of defense weapons.

* * * * *